Feb. 14, 1967 — C. F. FLEENOR — 3,304,020
CONTINUOUS WEB SECTIONAL CUTTING APPARATUS
Filed July 27, 1964 — 3 Sheets-Sheet 1
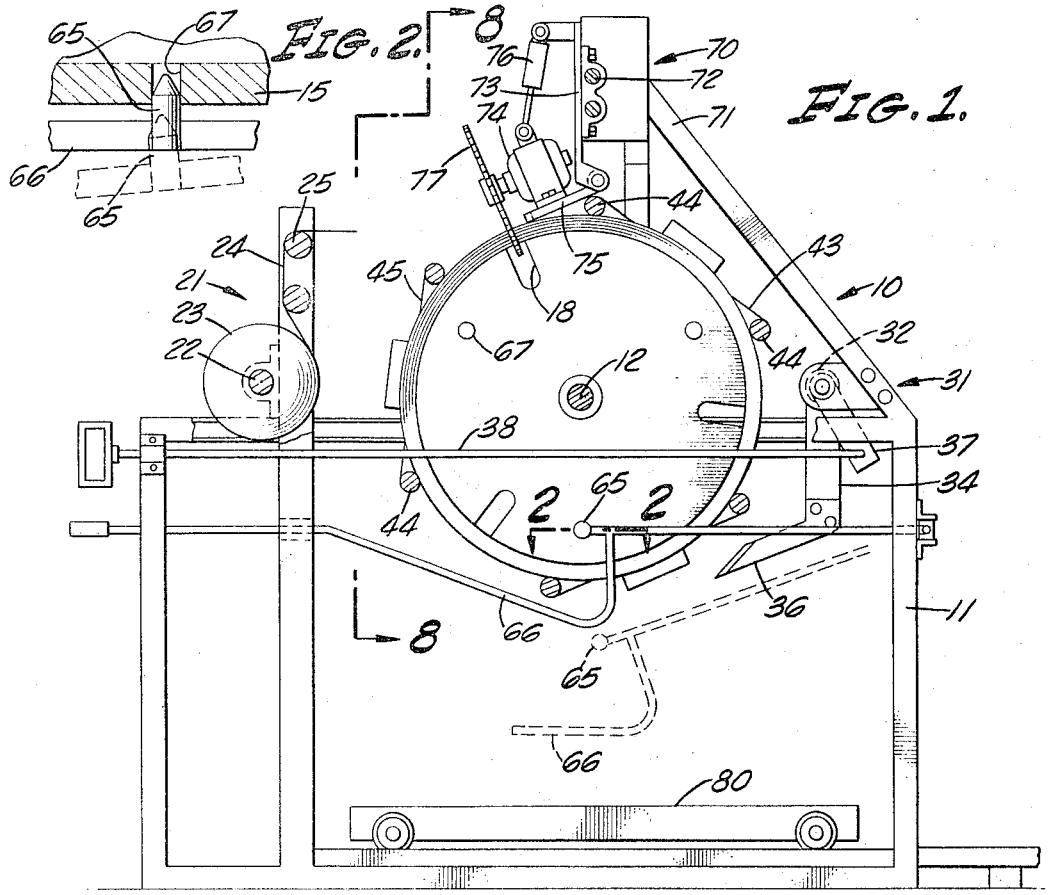
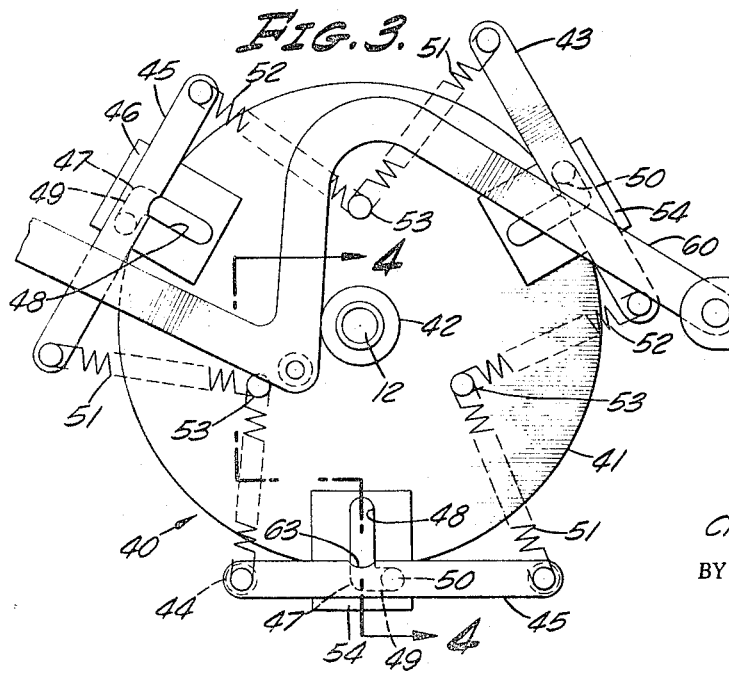
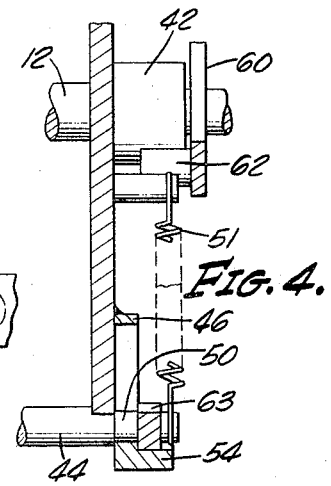
INVENTOR.
CHESTER F. FLEENOR
BY Lyon & Lyon
ATTORNEYS

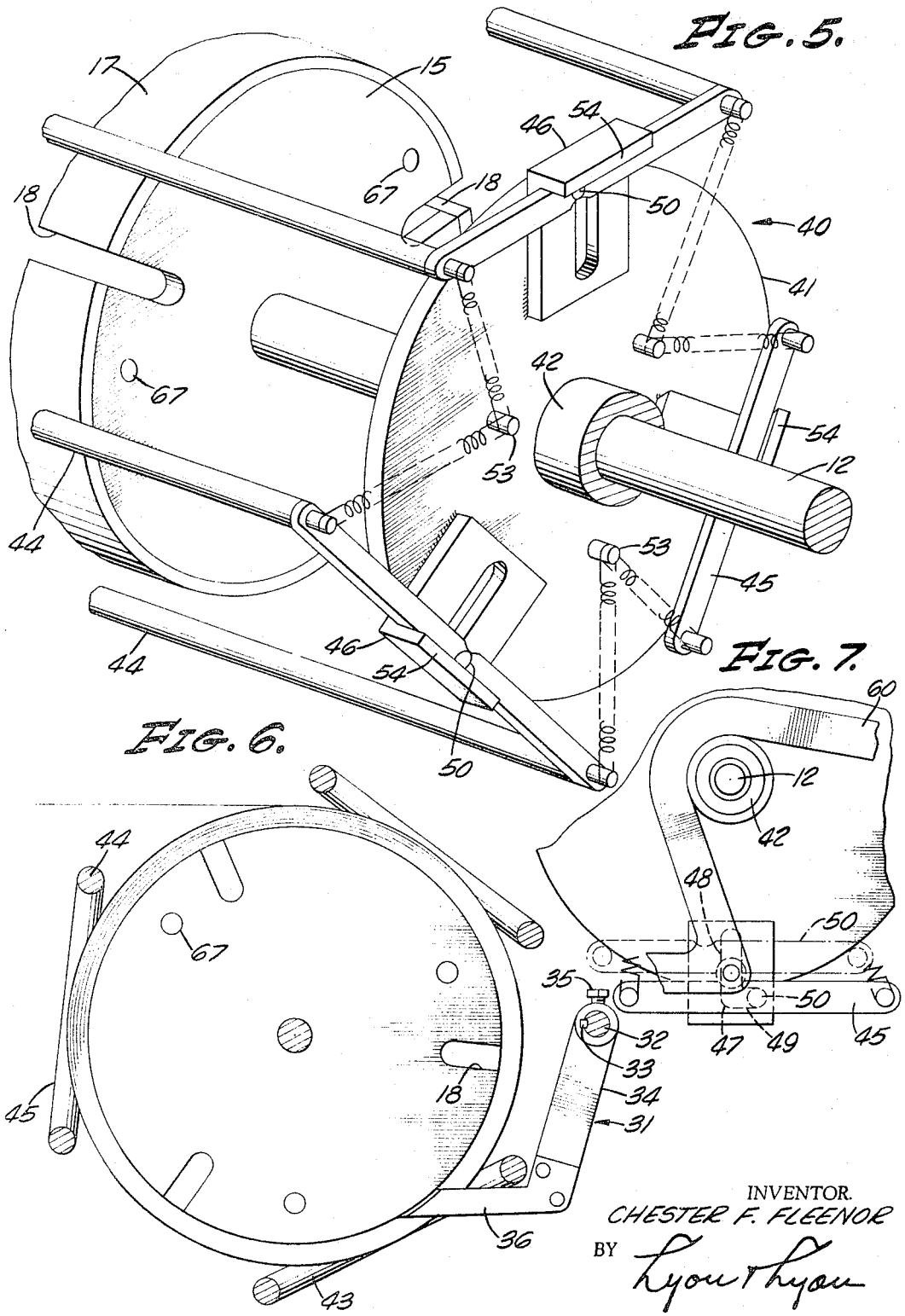

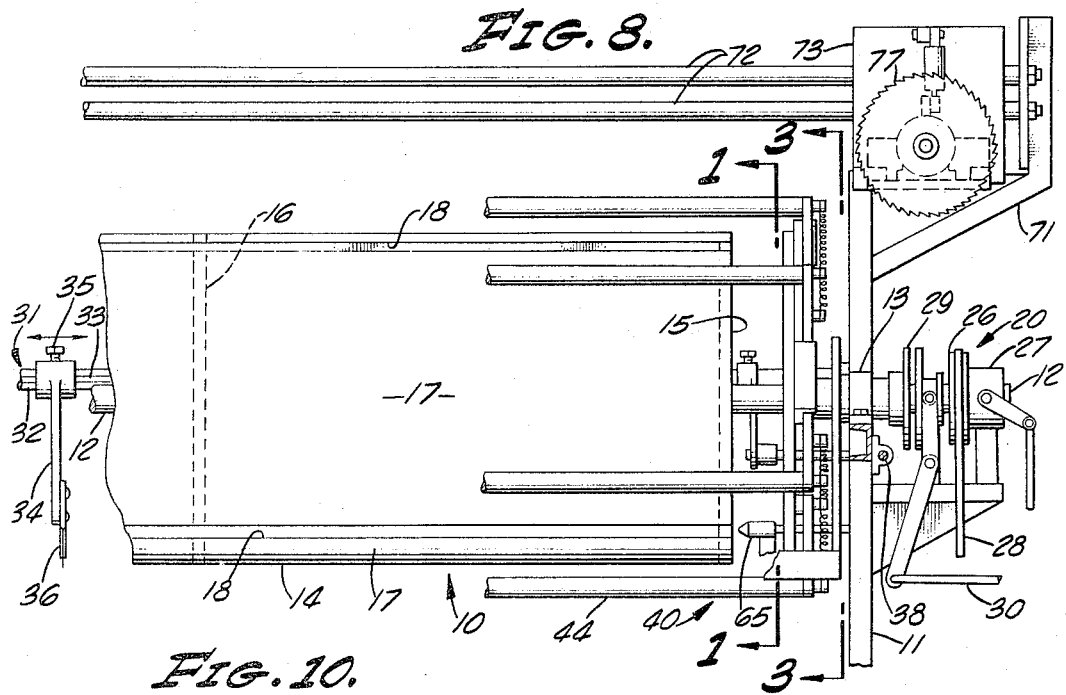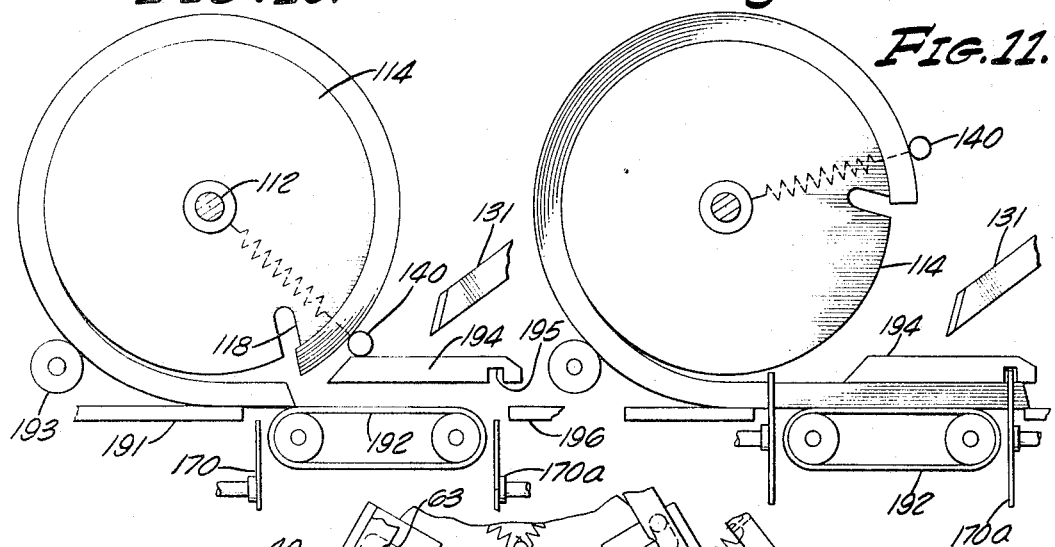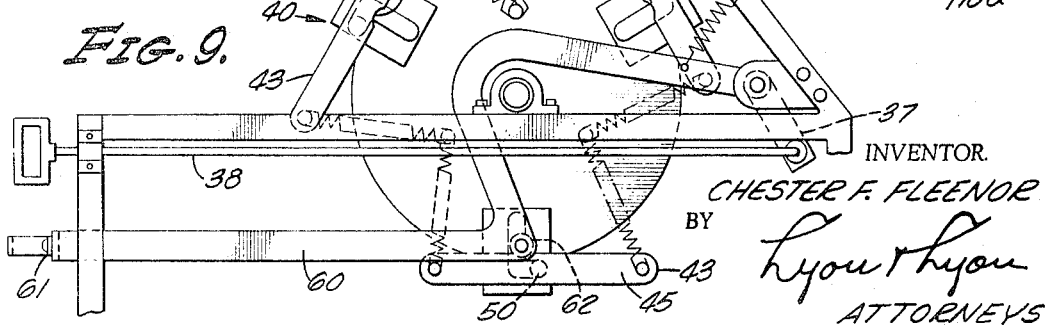

United States Patent Office 3,304,020
Patented Feb. 14, 1967

3,304,020
CONTINUOUS WEB SECTIONAL CUTTING
APPARATUS
Chester F. Fleenor, Goleta, Calif., assignor of twenty-five percent to William H. Drake, Santa Barbara, Calif.
Filed July 27, 1964, Ser. No. 385,118
9 Claims. (Cl. 242—56.6)

This invention relates to an apparatus for cutting sheets or sections of a predetermined accurate size from a continuous web or ribbon of thin flexible material and, in particular, is directed to such an apparatus of versatile and economical construction.

There are numerous manufacturing processes which use continuous webs or ribbons such as paper and plastic that are provided in rolls as raw stock. Certain of these processes require the material to be removed from the roll and cut into sections or sheets of a predetermined length and width perhaps for further processing. Still other processes, such as web press printing, use most of the roll of material but by the very nature of the process it is often impractical or impossible to use the entire roll thereby leaving unusable material on the end of the roll, sometimes referred to in the printing industry as the "stub ends" of the rolls. While the material of these roll stub ends may have various practical uses in cut sheet form, present conventional apparatus is not capable of or adaptable to economically sectioning these stub end rolls into sheets of a usable and exact size.

Accordingly, it is a principal object of this invention to provide a relatively inexpensive and economically operable apparatus for sectionally cutting continuous webs of any length into sheets of an accurate predetermined length and width.

Another object of this invention is to provide such an apparatus which occupies a very minimum of space and yet operates rapidly to result in the highest possible production for space occupied.

A further object of this invention is to provide an apparatus cut-sectioning a continuous web wherein a drum is rapidly rotated for wrapping the web thereon, clamps are actuated to clamp to the drum each section to be cut, and a longitudinal cutting device is rapidly operable to cleanly cut the sections while so clamped.

Still another object of this invention is to provide a novel apparatus for rapidly wrapping a continuous web on a drum, severing the wrap therefrom and sectioning the severed wrap into sheets of any desired size.

A still further object of this invention is to provide a novel form of web sectioning apparatus with a unique releasable clamping mechanism.

Other and more detailed objects and advantages of this invention will appear from the following description and the accompanying drawings, wherein:

FIGURE 1 is a sectional end view of the apparatus of this invention with the components in their respective positions for longitudinally cutting the wrapped web and taken substantially on the line 1—1 in FIGURE 8.

FIGURE 2 is a fragmentary sectional view of the rotational indexing and locking device taken substantially on the line 2—2 in FIGURE 1.

FIGURE 3 is a sectional end view of the clamping mechanism of the apparatus taken substantially on the line 3—3 in FIGURE 8.

FIGURE 4 is a fragmentary sectional elevation taken substantially on the line 4—4 in FIGURE 3.

FIGURE 5 is a perspective view of the drum and clamping mechanism of the apparatus.

FIGURE 6 is a fragmentary sectional end view similar to FIGURE 1 but illustrating the components in their respective positions of wrapping the web on the drum and circumferentially slitting the web.

FIGURE 7 is a fragmentary end view illustrating the actuation of the clamp operating mechanism.

FIGURE 8 is a sectional elevation view of the apparatus of this invention with portions broken away for clarity of illustration and taken substantially on line 8—8 in FIGURE 1.

FIGURE 9 is a fragmentary end elevation illustrating the drum clamps and operating mechanism.

FIGURES 10 and 11 are end elevations of a modified form of the apparatus of this invention and progressively illustrate the removal and sectioning of the wrap of web.

Referring now in detail to the embodiment of FIGURES 1 through 9, the apparatus, generally designated 10, of this invention, includes a frame 11 with a longitudinal shaft 12 rotatably mounted thereon by bearings 13 near each end. A drum 14 is fixedly mounted on the shaft 12 for rotation concentric therewith. It is preferred that the drum 14 be of as large a diameter as practical for receiving a relatively long length of continuous web in a minimum radial thickness of wraps thereon and thereby minimize the discrepancy in the circumferential lengths of wraps of web when cut as hereinafter described more fully. Also, the drum is preferably of light weight construction for ease of rapid rotation and in this regard may be comprised, for example, of end flanges 15 and intermediate flanges 16 with cylindrical wall segments 17 mounted on the flanges. The drum 14 is provided with one or more longitudinal slots 18 circumferentially spaced the distance equal to the desired length of the sectioned sheets of web to be produced on the apparatus. In the drawings, the drum 14 is provided with three slots 18 spaced 120° apart for accommodating cutting of the web into lengths equal to one-third of the drum circumference.

Means are provided for wrapping a continuous web on the drum 14 and, as shown in the drawings, these means may include a drive mechanism, generally designated 20, and a web roll support assembly generally designated 21. The roll support assembly 21 may be part of apparatus 10, as shown, or in particular installations the web roll might be supported by an adjacent machine that has been using the webbing such as a printing press whereby the stub end of the roll is run off that machine onto apparatus 10. Support assembly 21 includes a shaft 22 rotatably mounted on frame 11 parallel to shaft 12 and releasable for mounting the web roll 23 thereon. The continuous web 24 may then be reeved over roller bars 25, which are mounted parallel to shafts 12 and 22, and onto the surface of drum 14 with the web end being secured to the drum. The longitudinal length of drum 14 is equal to or longer than the width of the web 24.

The drive mechanism 20 includes a sheave 26 mounted on shaft 12 by means of a clutch mechanism 27 for selectively connecting and disconnecting the sheave to the shaft. A belt drive 28 is connected between sheave 26 and a motor (not shown) for selectively driving and rotating the shaft 12 and, in turn, the drum 14. Drive mechanism 20 also includes a brake 29 of any convenient type that is mounted on shaft 12 and operable by lever 30 for selectively stopping the shaft 12 and drum 14.

Thus the desired amount of continuous web 24 is wrapped on the drum 14 by; mounting the web roll on support assembly 21, reeving the end of the web onto the drum 14, disengaging the brake 29 and engaging the clutch mechanism 27 with the motor operating to rotate the drum clockwise as shown in FIGURE 1. When the web roll 23 is exhausted or a sufficient amount wrapped on the drum to form a laminar build-up, approximately one inch thick has been found satisfactory, the web is severed between the drum and the roll.

In order to section the laminar build-up of ribbon-like web into sheets of a width or length less than the full width of the web, a slitting assembly, generally designated 31, is provided and includes a longitudinal shaft 32 pivotal mounted on the frame 11 in back of and parallel to the drum 14. Shaft 32 is provided with a keyway 33 or the like for mounting pivot arms 34 therealong for pivotal movement with the shaft. Each pivot arm 34 has a lock screw 35 for adjusting the longitudinal position of the arm. A laterally extending knife blade 36 is mounted on each pivot arm 34 for circumferentially cutting the laminar build-up of webbing wrapped on the drum either during or at the end of the aforedescribed wrapping operation. A crank arm 37 is mounted on one end of the pivot shaft 32 and has an operating lever 38 connected from it to the front of the apparatus. With a knife 36 on a pivot arm 34 at each desired location of a circumferential slitting of the web, pulling of the lever 38 by the operator causes pivoting of shaft 32 to urge the knives against the web to progressively cut the web while rotating the drum 14, as shown in FIGURE 6.

Means are provided with the apparatus for clamping the wrapped webbing on the drum after such circumferential slitting and preparatory to longitudinally cutting the webbing into the desired size of sections and, as shown in the drawings, these means may include a releasable clamping assembly, generally designated 40, for separately clamping the web to the drum between each pair of slots 18. Clamping assembly 40 is provided with a flange 41 beyond either end of drum 14 and each flange 41 has a hub 42 rotatably mounted on central shaft 12. A clamping frame or structure 43 is provided for each drum wall segment 17 and may be comprised of a pair of parallel longitudinal clamp bars 44 joined at each end by connecting support bars 45. Bars 44 are longer than the spacing between flanges 41 thereby positioning bars 45 beyond the flanges 41. The bars 44 may be round as shown or of any other convenient cross section for engaging the outer surface of the webbing wrapped drum. Each flange 41 is provided with a guide bracket 46 mounted thereon for each of the clamping structures. The brackets 46 are provided with J slots 47 with substantially radial major portion 48 and a lateral portion 49 at the outer extreme. As viewed in FIGURES 3, 5, 7 and 9, the portions 49 of each slot 47 are offset in the counter-clockwise circumferential direction. A lateral pin 50 is mounted on the midpoint of each support bar 45 for guiding engagement with the J slot 47 of the associated bracket 46. A pair of tension springs 51 and 52 are connected from the ends of each support bar 45 to posts 53 on the flange 41 to continuously urge the clamping structures 43 inwardly. With posts 53 arranged as shown whereby the springs 51 and 52 connected to a given bar 45 incline inwardly toward each other, it is preferred that the spring positioned in the direction away from the direction of offset of slot portion 49, here spring 52 which is in the clockwise direction, be stronger for also urging the support bar 45 laterally to move the pin 50 into the lateral portion 49. As an alternative other separate biasing means may be provided with tangential flanges 54 for abutting the support bars 45 in their outermost position with pins 50 within the slot portions 45 to retain the support bars 45 in a tangential orientation to, in turn, space the longitudinal bars 44 from the surface of drum 14. The clamping structures 43 are self-retained in this outward or "released" position by the biasing of springs 51 and 52 and the positioning pin 50 in slot portion 49. Portion 48 of J slot 47 is of sufficient radial length to allow inward movement of clamping structures 43 to engage at least the minimum radial thickness of webbing that will be wrapped on the drum.

For convenience, a device is provided for individually moving the clamping structures 43 between the outer-released position and the inner-clamping position and, as shown in the drawings, this device may include a lever 60 on each end of the apparatus beyond flanges 41. The levers 60 are connected by a handle bar 61 in front and are pivotally mounted at the rear on the shaft 32 for convenience, or anywhere near shaft 32, for independent pivoting. The levers 60 are appropriately shaped as shown for avoiding interference with shaft 12 and other components during and between uses. A lateral pin 62 is provided and appropriately located on each lever 60 for engaging the radially inwardly facing portion of any support bar 45 positioned at the bottom of the drum upon downward pivoting of the levers 60. This downward movement causes radially outward movement of that support bar 45, as shown in FIGURE 7, until the pin 50 moves into lateral slot portion 49 to lock that structure in the released position. The levers 60 are raised and the drum 14 and clamping assembly 40 are rotated to position the next clamping structure 43 for this releasing outward movement as caused by the levers 60. In order to retract the clamping structures 43 inwardly from this outward "released" position, the levers 60 are held in the "down" position with the pins 62 engaging notches 63 provided in the support bars 45 of that structure 43 and the drum 14 is rotated slightly counterclockwise to move the pins 50 out of slot portions 47. The levers 60 are then released to allow the clamping structure to move upwardly and radially inwardly to the "clamping" position.

With the clamping structures 43 in the locked-released position, the drum 14 is rotated in the aforedescribed manner while the clamping assembly 40 is restrained from rotating to avoid interference with wrapping the web on the drum. After any desired circumferential slitting has been accomplished as described, the clamping structures 43 are oriented relative to the drum 14 between slots 18 and are retracted inwardly to clamp the web onto the drum as described. The drum 14 and clamping assembly 40 are then rotated as a unit to the proper indexed position for the pin 65 on a releasable lever 66 to engage a locating hole 67 on drum flange 15. A locating hole 67 is provided for each drum slot 18 and is approximately angularly spaced from such slot 18 to properly located the slot for the longitudinal cutting of the wrapped web.

Means are provided for longitudinally cutting the drum wrapped web and, as shown in the drawings, these means may include the powered rotary knife assembly, generally designated 70, mounted on the upper portion 71 of frame 11 which spans the drum 14 and clamping assembly 40. A pair of parallel rods 72 are mounted on frame portion 71 parallel to shaft 12. A bracket 73 is slidably mounted on rods 72 for non-rotating sliding movement the length of and beyond drum 14. A motor 74 is mounted on a platform 75 which is in turn pivotally mounted on bracket 73. A powered or manually operated activator 76 is connected between bracket 73 and the platform-mounted motor 74 for causing pivoting movement of the motor shaft toward and away from the drum 14. A circular saw or knife blade 77 is mounted on the shaft of motor 74 for rotation in a plane coincident with and extending radially from the axis of drum support shaft 12 when the motor is in the lowered position. A notch 18 is opposite blade 77 when index pin 65 engages a locating hole 67 for accommodating the blade. With the wrapped web clamped by structures 43 and pin 65 engaged, the knife blade 77 is rotated and lowered to cutting position at one end of the drum and then the bracket 73 is moved the length of the drum carrying the rotating knife blade to longitudinally cut the wrapped web.

The requisite number of longitudinal cuts, usually equal to the number of notches 18, are made by rotary knife assembly 70 by merely releasing pin 65 between cuts and rotating the drum 14 to the next locating hole 67. After such cuts have been made, the clamping structures are successively released in the manner heretofore described to drop the section web onto a cart 80 beneath the drum by the sectioned web falling between the clamping bars 44.

Referring now to the modification of FIGURES 10 and 11, a drum 114 is provided and mounted on a shaft 112 which is in turn mounted on a frame (not shown) for powered rotation in a manner similar to that heretofore described for wrapping the web on the drum. The drum 114 need only be provided with a single longitudinal slot 118 for accommodating a single longitudinal cut by means (not shown) similar to the aforedescribed powered rotary knife assembly 70 or by another similar powered rotary knife 170. A single removable spring-biased clamp 140 is provided for mounting on the wrapped web adjacent the single longitudinal cut. A circumferential slitting blade mechanism 131 may also be provided similar to the preferred embodiment. With the wrapped web clamped and longitudinally cut the drum 114 is slowly rotated to feed-off the laminar build-up or stack of webbing onto a platen 191 and conveyor belt 192. A follower roller 193 is provided for retaining most of the remaining wrapped web adjacent the surface of drum 114. A second powered rotary knife 170a is provided and spaced from the first knife 170 a distance equal to the desired length of the sectional web sheets. A back-up plate 194 having a groove 195 is positioned above the conveyor belt 192 and knife 170a and is movable downward to clamp the stack of webbing onto the belt 192 and the adjacent platen 196, as shown in FIGURE 10. The rotating blades 170 and 170a are then moved upwardly into cutting position and run the length of drum 114 to cut the stack of webbing. This procedure is repeated until the entire wrap is disposed of with clamp 140 being released upon reaching roller 193 to avoid interference therebetween. The rotary knife 170a together with plate 194 may be mounted for movement laterally toward and away from knife 170 and conveyor belt 192 may be adjustable in length to accommodate such knife movement whereby web sections of differing lengths may be cut.

Having fully described my invention, it is to be understood that I do not wish to be limited to the details herein set forth or to the detail illustrated in the drawings, but my invention is of the full scope of the appended claims.

I claim:

1. An apparatus for sectioning a continuous web, comprising a cylindrical drum, means for rotating said drum for wrapping the web thereon, means for clamping the wrapped web to the drum, and means for longitudinally cutting the wrapped web at plural circumferentially spaced locations for creating plural web sections, said clamping means encircling and concentrically rotatable with said drum, said clamping means including separate longitudinally extending means for clamping each said web section in at least two places circumferentially between each pair of said locations of longitudinal cutting, each said separate longitudinally extending means selectively operable to clamp or release one of said plural web sections.

2. An apparatus for sectioning a continuous web, comprising, a cylindrical drum, means for rotating said drum for wrapping the web thereon, plural means for clamping the wrapped web to the drum, said plural clamping means encircling and concentrically rotatable with said drum, longitudinally movable blade means for longitudinally cutting through the wrapped web at circumferentially spaced locations to produce plural longitudinal cuts in the wrapped web, at least one said clamping means positioned between each said longitudinal cut, said plural clamping means selectively operable to rotate with said drum in clamping position but remain stationary during web wrapping rotation of said drum, and means for releasing said clamping means to release the sectioned web.

3. An apparatus for cutting a thin continuous web into predetermined length sections, the combination of: a cylindrical drum, said drum having a circumference equal to a whole number multiple of said predetermined length, power means for selectively and rapidly rotating said drum for wrapping the continuous web thereon, a releasable clamp assembly encircling said drum and having means for clamping the wrapped web to the drum, said clamp assembly mounted for rotation concentrically with said drum in clamping condition and selectively operable to remain stationary during web wrapping rotation of said drum, powered rotary knife means mounted for rotation on an axis tangential to and spaced from the drum, said rotary knife means longitudinally slidable the length of said drum, and means for index locating said drum relative to said rotary knife means while moving longitudinally to cut the wrapped web into said sections with said clamp assembly in the clamping position to retain the cut web.

4. An apparatus for cutting a thin continuous web into predetermined length sections, the combination of: a cylindrical drum, said drum having a circumference equal to an integer multiple of said predetermined length, longitudinal slots in said drum circumferentially spaced a distance equal to the predetermined length of the sections, power means for selectively and rapidly rotating said drum for wrapping the continuous web thereon, a releasable clamp assembly encircling said drum for clamping the web thereto, said clamp assembly mounted for selective rotation with said drum in clamping position and remaining stationary during web wrapping rotation of said drum, knife blade means mounted for movement toward said drum during rotation and prior to said clamping for circumferentially slitting the wrapped web to any desired widths, powered rotary knife means mounted for rotation on an axis tangential to and spaced from the drum, said rotary knife means longitudinally slidable the length of said drum, and means for index locating said drum with a said longitudinal slot adjacent said rotary knife means for accommodating said rotary knife means while moving longitudinally to cut the wrapped web with said clamp assembly in the clamping position to retain the cut web on the drum, said clamping assembly including means located circumferentially between each pair of longitudinal slots to clamp to the drum the web section cut at such slots.

5. An apparatus for cutting a thin continuous web into predetermined length sections, the combination of: a cylindrical drum having a central shaft, said drum having a circumference equal to a whole number multiple of said predetermined length, power means for rotating said drum for wrapping the continuous web thereon, a releasable clamp assembly encircling said drum, said clamp assembly including a pair of flange plates rotatably mounted on said shaft with one flange plate at either end of said drum for rotation with or separate from said drum, clamping structures at least equal in number to the said number of section lengths on said drum circumference, each clamping structure having a pair of spaced longitudinal bars positioned parallel to the surface of said drum and joined at each end, each flange plate having means for guiding the ends of the clamping structures and locking said clamping structures in an outward-released position, biasing means urging each longitudinal end of each clamping structure inwardly for clamping the wrapped web against said drum, powered rotary knife means mounted for rotation on an axis tangential to and spaced from the drum, said rotary knife means longitudinally slidable the length of said drum, and means for index locating said drum relative to said rotary knife means while moving said rotary knife means longitudinally to cut the wrapped web into said sections with said clamping structures in the biased clamping position between said cuts to retain the cut web on the drum.

6. In an apparatus for cutting a thin continuous web into sections of a predetermined length, the combination of: a frame, a cylindrical drum having a central shaft extending beyond said drum and rotatably mounted on said frame, said drum having a circumference equal to a whole number multiple of said predetermined length, power means for selectively and rapidly rotating said drum for wrapping the continuous web thereon, a releasable clamp assembly mounted on said shaft and encircling said drum, said clamp assembly including a pair of flange plates rotatably mounted on said shaft with one flange plate at either end of said drum, clamping structures extending between said flanges, each clamping structure having a pair of spaced longitudinal bars positioned parallel to the surface of said drum for engaging the web, a support bar connecting each end of said longitudinal bars, each flange plate having means forming a radial J slot for each support bar, each support bar having a pin for engaging and being guided within said J slot, biasing means urging each longitudinal end of each clamping structure inwardly for clamping the wrapped web against said drum, each said J slot oriented for retaining said support bar in the outermost position against the force of said biasing means with said pin in the offset portion of the J slot, lever means mounted for selectively urging each said clamping structure outwardly to release the web, powered rotary knife means mounted for rotation on an axis tangential to and spaced from the drum, said knife means longitudinally slidable the length of said drum, and means for index locating said drum relative to said rotary knife means while moving longitudinally to cut the wrapped web with said clamping structures in the biased clamping position to retain the cut web on the drum.

7. In an apparatus for cutting a thin continuous web into sections of a predetermined length and width, the combination of: a frame, a cylindrical drum having a central shaft extending beyond said drum and rotatably mounted on said frame, said drum having a circumference equal to a whole number multiple of said predetermined length, longitudinal slots in said drum circumferentially spaced a distance equal to the predetermined length of the sections, power means for selectively and rapidly rotating said drum for wrapping the continuous web thereon, a releasable clamp assembly mounted on said shaft and encircling said drum, said clamp assembly including a pair of flange plates rotatably mounted on said shaft with one flange plate at either end of said drum and clamping structures at least equal in number to the number of said drum slots, each clamping structure having a pair of spaced longitudinal bars positioned parallel to the surface of said drum and a support bar joining each end of said longitudinal bars, each flange plate having means forming a radial J slot for each support bar, each support bar having a pin for engaging and being guided within said J slot, biasing means urging each longitudinal end of each clamping structure inwardly for clamping the wrapped web against said drum, each said J slot oriented for retaining said support bar in the outermost position against the force of said biasing means with said pin in the offset portion of the J slot, lever means mounted for selectively urging each said clamping structure outwardly to release the web, knife blade means mounted on said frame and movable toward said drum during rotation and prior to said clamping for circumferentially slitting the wrapped web into any desired width, powered rotary knife means mounted on said frame for rotation on an axis tangential to and spaced from the drum, said rotary knife means longitudinally slidable the length of said drum, means for index locating said drum with a said longitudinal slot adjacent said rotary knife means while moving longitudinally to cut the wrapped web into said sections with said clamping structures in the biased clamping position to retain the cut web on the drum.

8. An apparatus for sectioning a ribbon-like web, comprising, a cylindrical structure, means for rotating said cylindrical structure about its axis and applying a plurality of layers of ribbon-like web firmly against the curved periphery of said structure in the form of a laminar build-up on said cylindrical structure, cutting means to cut through said layers along a path parallel to the axis of rotation of said cylindrical structure, and pressure means in areas on the curved periphery of said cylindrical structure in two continuous zones from one side to the other of the web in said build-up, said zones being positioned relatively near the path of said cutting means on opposite sides of said cutting path for holding the build-up against said cylindrical structure until after said cutting means has completed such cut, said pressure means encircling said cylindrical structure and mounted for selective rotation with said cylindrical structure when applying pressure to hold the build-up against the cylindrical structure and operable to a stationary position during rotation of said cylindrical structure or applying the web build-up.

9. An apparatus for cutting a thin continuous web into predetermined length sections, comprising, a cylindrical drum having a central shaft, power means for rotating said drum for wrapping the continuous web thereon, a releasable clamp assembly encircling said drum, said clamp assembly including a pair of flange plates rotatably mounted on said shaft with one flange plate at either end of said drum for rotation with or separate from said drum, clamping structures at least equal in number to the said number of section lengths on the circumference of said drum, each clamping structure having a pair of spaced longitudinal bars positioned parallel to the surface of said drum and joined at each end, each flange plate having means for guiding the ends of the clamping structures and locking said clamping structures in an outward-released position, biasing means urging each longitudinal end of each clamping structure inwardly for clamping the wrapped web against said drum, knife means mounted adjacent said drum and longitudinally slidable along the length of said drum, and means for releasably locating said drum relative to said knife means with the knife means positioned circumferentially between two clamping structures for longitudinally cutting the wrapped web with said knife means while said clamping structures retain the web on said drum.

References Cited by the Examiner

UNITED STATES PATENTS

| | | |
|---|---|---|
| 538,464 | 4/1895 | Palmer et al. |
| 692,474 | 2/1902 | Pope. |
| 1,354,464 | 10/1920 | Cameron et al. _____ 242—56.5 |
| 1,414,818 | 5/1922 | Kislevitz _____ 242—62 X |
| 1,542,082 | 6/1925 | Nelson _____ 242—56 |
| 2,208,774 | 7/1940 | Pierson _____ 242—63 X |
| 2,703,612 | 3/1955 | Nye et al. _____ 242—56 |
| 2,805,828 | 9/1957 | Bachman _____ 242—63 |
| 2,819,760 | 1/1958 | Norehad _____ 242—110.1 X |

FOREIGN PATENTS 1,333,951  6/1963  France.

FRANK J. COHEN, *Primary Examiner.*

STANLEY N. GILREATH, *Examiner.*

W. S. BURDEN, *Assistant Examiner.*